US011819806B1

(12) United States Patent
Brown et al.

(10) Patent No.: US 11,819,806 B1
(45) Date of Patent: Nov. 21, 2023

(54) METHODS FOR MANUFACTURING A SOLID STATE IONIC CONDUCTIVE MEMBRANE ON A MACRO POROUS SUPPORT SCAFFOLD

(71) Applicant: Ampcera Inc., Milpitas, CA (US)

(72) Inventors: James Emery Brown, Tucson, AZ (US); Hui Du, Tucson, AZ (US); Chen Chen, Tucson, AZ (US); Sumin Zhu, San Francisco, CA (US)

(73) Assignee: Ampcera Inc., Milpitas, CA (US)

( * ) Notice: Subject to any disclaimer, the term of this patent is extended or adjusted under 35 U.S.C. 154(b) by 825 days.

(21) Appl. No.: 16/653,250

(22) Filed: Oct. 15, 2019

Related U.S. Application Data

(60) Provisional application No. 62/745,509, filed on Oct. 15, 2018.

(51) Int. Cl.
| | |
|---|---|
| *B01D 67/00* | (2006.01) |
| *B01D 53/22* | (2006.01) |
| *B01D 69/10* | (2006.01) |
| *H01M 8/1016* | (2016.01) |
| *H01M 8/18* | (2006.01) |
| *C22B 3/42* | (2006.01) |
| *B05D 3/02* | (2006.01) |
| *B05D 1/08* | (2006.01) |
| *B05D 1/18* | (2006.01) |
| *B05D 1/02* | (2006.01) |

(Continued)

(52) U.S. Cl.
CPC ....... *B01D 67/0058* (2013.01); *B01D 53/228* (2013.01); *B01D 69/10* (2013.01); *H01M 8/1016* (2013.01); *H01M 8/188* (2013.01); *B05D 1/02* (2013.01); *B05D 1/08* (2013.01); *B05D 1/18* (2013.01); *B05D 1/265* (2013.01); *B05D 3/02* (2013.01); *B05D 3/107* (2013.01); *C22B 3/42* (2013.01); *H01M 2300/0068* (2013.01)

(58) Field of Classification Search
CPC .. B01D 67/0058; B01D 53/228; B01D 69/10; H01M 8/10; H01M 8/16; H01M 8/188; H01M 10/02; H01M 2300/0068; B05D 1/02; B05D 1/08; B05D 1/18; B05D 1/265; B05D 3/02; B05D 3/107
USPC .................................................. 427/243, 115
See application file for complete search history.

(56) References Cited

U.S. PATENT DOCUMENTS

| | | | |
|---|---|---|---|
| 3,508,994 | A | 4/1970 | Nyrop |
| 4,255,208 | A | 3/1981 | Deutscher et al. |

(Continued)

FOREIGN PATENT DOCUMENTS

| | | |
|---|---|---|
| CN | 102718494 B | 3/2014 |
| EP | 0524678 A1 | 1/1993 |

(Continued)

OTHER PUBLICATIONS

Brushett et ai.: An All-Organic Non-aqueous Lithium-Ion Redox Flow Battery, Advanced Energy Materials, 2012, vol. 2, pp. 1390-1396.

(Continued)

*Primary Examiner* — Brian K Talbot
(74) *Attorney, Agent, or Firm* — Walters & Wasylyna LLC (57) ABSTRACT

A method for manufacturing a solid state ionic conductive membrane includes forming a solid state ionic conductive membrane on a support scaffold and treating the support scaffold to be macro porous.

17 Claims, 10 Drawing Sheets

(51) Int. Cl.
*B05D 3/10* (2006.01)
*B05D 1/26* (2006.01)

(56) References Cited

U.S. PATENT DOCUMENTS

| | | | |
|---|---|---|---|
| 4,668,593 | A | 5/1987 | Sammells |
| 4,770,908 | A | 9/1988 | Mori et al. |
| 4,846,931 | A | 7/1989 | Gmitter et al. |
| 5,006,247 | A | 4/1991 | Dennison et al. |
| 5,160,618 | A | 11/1992 | Burggraaf et al. |
| 5,215,729 | A | 6/1993 | Buxbaum |
| 5,269,926 | A | 12/1993 | Webster et al. |
| 5,668,188 | A | 9/1997 | Whinnery et al. |
| 6,071,795 | A | 6/2000 | Cheung et al. |
| 6,352,909 | B1 | 3/2002 | Usenko |
| 6,461,772 | B1 | 10/2002 | Miyake et al. |
| 6,475,661 | B1 | 11/2002 | Pellegri et al. |
| 6,524,736 | B1 | 2/2003 | Sompalli et al. |
| 6,565,632 | B1 | 5/2003 | van Hassel |
| 6,649,559 | B2 | 11/2003 | Drost et al. |
| 6,699,276 | B2 | 3/2004 | Sogard et al. |
| 6,740,604 | B2 | 5/2004 | Kelly et al. |
| 6,974,521 | B2 | 12/2005 | Schermer |
| 7,108,813 | B2 | 9/2006 | Kang et al. |
| 7,125,626 | B2 | 10/2006 | Kato |
| 7,163,713 | B2 | 1/2007 | Jacobson et al. |
| 7,182,894 | B2 | 2/2007 | Kumar et al. |
| 7,316,919 | B2 | 1/2008 | Childs et al. |
| 7,431,838 | B2 | 10/2008 | Kang et al. |
| 7,442,303 | B2 | 10/2008 | Jacobson |
| 7,547,393 | B2 | 6/2009 | Ramaswamy et al. |
| 7,621,979 | B2 | 11/2009 | Kaigawa et al. |
| 7,767,256 | B2 | 8/2010 | Gu et al. |
| 7,767,257 | B2 | 8/2010 | Gu et al. |
| 7,820,321 | B2 | 10/2010 | Home et al. |
| 7,867,669 | B2 | 1/2011 | Liu et al. |
| 3,056,731 | A1 | 11/2011 | Ramaswamy et al. |
| 8,052,775 | B2 | 11/2011 | Hou et al. |
| 8,075,758 | B2 | 12/2011 | Joshi et al. |
| 8,313,968 | B2 | 11/2012 | Elgawadi |
| 8,506,790 | B2 | 8/2013 | Balagopal et al. |
| 8,691,413 | B2 | 4/2014 | Esswein et al. |
| 8,715,392 | B2 | 5/2014 | Liu |
| 8,889,300 | B2 | 11/2014 | Bugga et al. |
| 9,156,006 | B2 | 10/2015 | Yip et al. |
| 9,300,000 | B2 | 3/2016 | Jansen et al. |
| 9,368,775 | B2 | 6/2016 | Visco et al. |
| 9,419,299 | B2 | 8/2016 | Visco et al. |
| 9,512,041 | B2 | 12/2016 | Mcevoy et al. |
| 9,724,640 | B2 | 8/2017 | Joo et al. |
| 9,954,229 | B2 | 4/2018 | Xiao |
| 10,079,391 | B2 | 9/2018 | Kjeang et al. |
| 10,088,751 | B2 | 10/2018 | Yang et al. |
| 11,177,498 | B1 * | 11/2021 | Brown ................ H01M 8/1016 |
| 11,239,491 | B2 * | 2/2022 | Huang ................ H01M 4/131 |
| 2005/0227455 | A1 | 10/2005 | Park et al. |
| 2006/0025866 | A1 | 2/2006 | Serafin et al. |
| 2007/0087328 | A1 | 4/2007 | Sleytr et al. |
| 2008/0142373 | A1 | 6/2008 | Joshi et al. |
| 2008/0173540 | A1 | 7/2008 | Joshi et al. |
| 2008/0299377 | A1 * | 12/2008 | Gu ..................... B01D 71/024 427/181 |
| 2009/0000475 | A1 | 1/2009 | Fekety et al. |
| 2009/0035631 | A1 | 2/2009 | Zagaja et al. |
| 2009/0057162 | A1 | 3/2009 | Balagopal et al. |
| 2009/0130477 | A1 * | 5/2009 | Hou .................... B01D 53/228 428/316.6 |
| 2010/0255376 | A1 * | 10/2010 | Park ................... H01M 50/411 427/78 |
| 2011/0201180 | A1 | 8/2011 | Elgawadi |
| 2011/0223450 | A1 | 9/2011 | Home et al. |
| 2012/0135278 | A1 | 5/2012 | Yoshie et al. |
| 2013/0011704 | A1 | 1/2013 | Home et al. |
| 2013/0048509 | A1 | 2/2013 | Balagopal et al. |
| 2013/0137010 | A1 * | 5/2013 | Aitken .................. C03C 3/16 264/618 |
| 2013/0323611 | A1 | 12/2013 | Wang et al. |
| 2016/0334699 | A1 | 11/2016 | Doi et al. |
| 2016/0351973 | A1 * | 12/2016 | Albano ................ H01M 4/628 |
| 2017/0189861 | A1 * | 7/2017 | Kang .................. B01D 53/228 |
| 2018/0138543 | A1 * | 5/2018 | Huang ................ H01M 4/134 |
| 2019/0181461 | A1 | 6/2019 | Weber et al. |
| 2019/0217252 | A1 | 7/2019 | Newbloom et al. |
| 2020/0266484 | A1 * | 8/2020 | Du ..................... C01G 35/006 |

FOREIGN PATENT DOCUMENTS

| | | |
|---|---|---|
| EP | 2545984 A1 | 1/2013 |
| GB | 2565070 A | 2/2019 |
| JP | 5674040 B2 | 2/2015 |

OTHER PUBLICATIONS

Chen et al.: Lithium-Organic Nanocomposite Suspension for High-Energy-Density Redox Flow Batteries, ACS Energy Letter, 2018, vol. 3, pp. 1991-1997.

Delmdahl et al.: Large-Area Laser-Lift-Off Processing in Microelectronics, Physics Procedia, 2013, vol. 41, pp. 241-248.

Ding et al.: A High-Performance All-Metallocene-Based, Non-Aqueous Redox Flow Battery, Energy & Environmental Science, 2017, vol. 10, pp. 491-497.

Doughty et al.: Batteries for Large-Scale Stationary Electrical Energy Storage, The Electrochemical Society Interface, 2010, vol. 19, No. 3, pp. 49-53.

Duduta et al.: Semi-Solid Lithium Rechargeable Flow Battery, Advance Energy Materials, 2011, vol. 1, No. 4, pp. 511-516.

Hamelet et al.: Non-Aqueous Li-Based Redox Flow Batteries, Journal of the Electrochemical Society, 2012, vol. 159, No. 8, pp. A1360-A1367.

Jia et al.: High-Energy Density Nonaqueous All Redox Flow Lithium Battery Enabled with a Polymeric Membrane, Science Advances, 2015, vol. 1, No. 10, p. e1500886.

Kouras et al.: Macro-Porous Ceramic Supports for Membranes Prepared from Quartz Sand and Calcite Mixtures, Journal of the European Ceramic Society, 2017, vol. 37, No. 9, pp. P3159-P3165.

Lee et al.: Water-Soluble Epitaxial NaCl Thin Film for Fabrication of Flexible Devices, Scientific Reports, 2017, vol. 7, No. 8716, pp. 1-7.

Liao et al.: A Macro-Porous Graphene Oxide-Based Membrane as a Separator with Enhanced Thermal Stability for High-Safety Lithium-ion Batteries, Royal Society of Chemistry Advances, 2017, vol. 7, No. 36, pp. 22112-22120.

Lobankova et al.: Laser Lift-Off Technique, Modern Technique and Technologies 2012, pp. 26-27.

Placke et al.: Lithium ion, Lithium Metal, and Alternative Rechargeable Battery Technologies: The Odyssey for High Energy Density, Journal of Solid State Electrochemistry, 2017, vol. 21, No. 7, pp. 1939-1964.

Prifti et al.: Membranes for Redox Flow Battery Applications, Membranes, 2012, vol. 2, No. 2, pp. 275-306.

R. Jonson and P. McGinn, Tape Casting and Sintering of Li7La3Zr1.75Nb0.25A10.1O12 with Li3BO3 Additions, Solid State Ionics, 2018, vol. 323, No. 1, pp. 49-55.

Salimi Jazi et al.: Spray-Formed, Metal-Foam Heat Exchangers for High Temperature Applications, Journal of Thermal science and Engineering Applications, 2009, vol. 1, No. 3, pp. 031008 (7 pages).

Skyllas-Kazacos et al.: Progress in Flow Battery Research and Development, Journal of Electrochemical Socity, 2011, vol. 158, No. 8, pp. R55-R79.

G. Soloveichik: Battery Technologies for Large-Scale Stationary Energy Storage, Annual Review of Chemical and Biomolecular Engineering, 2011, vol. 2, pp. 503-527.

Wang et al.: Li-Redox Flow Batteries Based on Hybrid Electrolytes: At the Cross Road between Li-ion and Redox Flow Batteries, Advance Energy Materials, 2012, vol. 2, No. 7, pp. 770-779.

Wang et al.: Recent Progress in Redox Flow Battery Research and Development, Advance Functional Materials, 2012, vol. 23, No. 8, pp. 1-17.

(56) References Cited

OTHER PUBLICATIONS

Weber et al.: Redox Flow Batteries: A Review, Journal of Applied Electrochemistry, 2011, vol. 41, pp. 1137-1164.

Yang et al.: A Membrane-Free Lithium/Polysulfide Semi-Liquid Battery for Large-Scale Energy Storage, Energy & Environmental Science, 2013, vol. 6, pp. 1552-1558.

Yi et al.: Flame Made Nanoparticles Permit Processing of Dense, Flexible, Li+ Conducting Ceramic Electrolyte Thin Films of Cubic-$Li_7La_3Zr_2O_{12}$ (c-LLZO), Journal of Materials Chemistry A, 2016, vol. 4, No. 33, pp. 12947-12954.

Zhang et al.: Porous Silicon Carbide Ceramics Produced by a Carbon Foam Derived from Mixtures of Mesophase Pitch and Si Particles, Journal of the American Ceramic Society, 2009, vol. 92, No. 1, pp. 260-263.

Zhao et al.: A Chemistry and Material Perspective on Lithium Redox Flow Batteries Towards High-Density Electrical Energy Storage, Chemical Society Reviews, 2015, vol. 44, No. 22, pp. 7968-7996.

\* cited by examiner

METHODS FOR MANUFACTURING A SOLID STATE IONIC CONDUCTIVE MEMBRANE ON A MACRO POROUS SUPPORT SCAFFOLD

PRIORITY

The present invention claims the priority of U.S. Provisional Patent Application No. 62/745,509, filed Oct. 15, 2018, which is incorporated herein by reference in its entirety.

FIELD

The present application relates to the field of solid state ionic conductive membranes and methods for manufacturing solid state ionic conductive membranes.

BACKGROUND

Solid state ionic conductive membranes have grown in interest in recent years for applications such as alkaline metal (Li, Na, K) purification, elemental separation, proton transportation based redox flow batteries or fuel cells, and solid-state electrolytes for primary and rechargeable alkaline batteries or other metal ion batteries include but not limited to Ag, Mg, Al, Zn, etc.

Solid state ionic conductive membranes have grown in interest in recent years for applications such as gas filtration, metal-rich extraction and recycling, redox flow and lithium batteries. The ideal solid state ionic conductive membrane for many applications is characterizable as a thin membrane with a continuous flat surface.

Some applications require a macro porous support scaffold to enhance the mechanical strength of the ionic conductive membrane without sacrificing the fluid dynamic advantages. To achieve an ionic membrane with the desired characteristics on such a support scaffold can be described as difficult at best.

Prior art includes using a macro porous scaffold to build catalysis thin films, such as Journal of European Ceramic Society, Vol. 37 (9), P3159-3165, 2017. These kind of reports mostly are utilizing the permeability of the scaffold, when they build the thin film for catalysis, they are targeting to increasing the surface area of the thin films to increase its catalytic effectiveness.

There are also other reports to use porous structures to act as holder for graphene thin sheet, RSC Adv., 2017(7), 22112-22120, which is relatively easier because of graphene's 2D structure. It lacks of the complication compared to grow a continuous film on top of a macro porous structure.

SUMMARY

In an embodiment of the present disclosure, a method for manufacturing a solid state ionic conductive membrane includes forming a solid state ionic conductive membrane on a support scaffold and treating the support scaffold to be macro porous.

Other embodiments of the disclosed method for manufacturing a solid state ionic conductive membrane will become apparent from the following detailed description, the accompanying drawings and the appended claims.

DETAILED DESCRIPTION

In an embodiment of the present disclosure, a method for manufacturing a solid state ionic conductive membrane includes forming a solid state ionic conductive membrane on a support scaffold and treating the support scaffold to be macro porous.

The method for manufacturing the solid state ionic conductive membrane may include any one or more of the following aspects, separately or in combination.

The step of forming the solid state ionic conductive membrane on the removable support substrate may include, for example, at least one of slurry sedimentation, spraying, dipping, filtration, pyrolysis, electroplating, plasma spray, thermal spray, fume spray, screen printing, tape casting, injection, chemical vapor deposition, physical vapor deposition, and sputtering.

The support scaffold may include a macro porous substrate pre-filled with a filler material, and the step of treating the support scaffold to be macro porous may include removing the filler material.

The macro porous substrate may include, for example, at least one of nickel foam, copper foam, carbon foam, silicon foam, silicon carbide, silicon nitride, aluminum nitride, alumina, and zirconia.

The filler material may include, for example, at least one of a salt, a resin, and a wax.

The step of removing the filler material may include, for example, at least one of dissolving the filler material and heating the filler material. Dissolving may include completely dissolving the filler material or partially dissolving (e.g., etching) the filler material.

The support scaffold may include a macro porous substrate pre-filled with a filler material, and the step of treating the support scaffold to be macro porous may include hardening the filler material and removing the macro porous substrate.

The filler material may include, for example, a polymer.

The step of hardening the filler material may include, for example, at least one of curing the filler material and drying the filler material.

The step of removing the macro porous substrate may include, for example, at least one of dissolving the macro porous substrate and heating the macro porous substrate. Dissolving may include completely dissolving the macro porous substrate or partially dissolving (e.g., etching) the macro porous substrate.

The support scaffold may include a solid green body, and the step of treating the support scaffold to be macro porous may include transforming the solid green body to a macro porous support scaffold.

The macro porous support scaffold may include, for example, at least one of silicon carbide, silicon nitride, zirconium dioxide, and aluminum oxide.

The method for manufacturing the solid state ionic conductive membrane may further include densifying the solid state ionic conductive membrane.

The step of densifying the solid state ionic conductive membrane may occur before, during, or after the step of treating the support scaffold to be macro porous.

The step of densifying the solid state ionic conductive membrane may include heat treating the solid state ionic conductive membrane.

The step of heat treating the solid state ionic conductive membrane may include sintering the solid state ionic conductive membrane.

The method for manufacturing the solid state ionic conductive membrane may further include any one or more of the following additional aspects, separately or in combination, together with any one or more of the previous aspects, as well as any one or more aspects illustrated in the drawings.

A solid state ionic conductive membrane includes or is formed from a solid state ionic conductive material. A solid state ionic conductive material can be described as a material that may have the following characteristics:

A solid state ionic conductive material is a type of material that can selectively allow a specific charged element to pass through under the presence of an electric field or chemical potential, such as concentration differences.

While this solid state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Al^{3+}$, $Zn^{4+}$, etc.

The present disclosure outlines several methods to pre-fill a removable filler material into the support scaffolds in which an ionic conductive membrane can be built on top. Following the fabrication of the ionic conductive membrane, the filler can be removed leaving behind a macro porous support scaffold having pores of a size greater than 50 nanometers, preferably having pores of a size greater than 1 micron.

The ionic conductivity of the corresponding ions is preferably to be $>10^{-7}$ S/cm. It is preferably to have lower electronic conductivity ($<10^{-8}$ S/cm).

Examples of the ionic conductive material include but not limited to a garnet-like structure oxide material with the general formula:

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n = 7 + a' + 2 \cdot a'' - b' - 2 \cdot b'' - 3 \cdot c' - 4 \cdot c''$ and $4.5 \leq n \leq 7.5$.

In another example, an ionic conductive membrane includes perovskite-type oxides such as $(Li,La)TiO_3$ or doped or replaced compounds.

In yet another example, an ionic conductive membrane includes NASICON-structured lithium membrane, such as LAGP ($Li_{1+x}Al_xGe_{2-x}(PO_4)_3$), LATP ($Li_{1+x}Al_xTi_{2-x}(PO_4)_3$) and these materials with other elements doped.

In yet another example, an ionic conductive membrane includes anti-perovskite structure materials.

In yet another example, an ionic conductive membrane includes $Li_3YH_6$(H=F, Cl, Br, I) family of materials, Y can be replaced by other rare earth elements.

The present disclosure relates to an ionic conductive membrane built on and supported by a macro porous support scaffold and to the fabrication of a continuous, thin, ionic conductive membrane on pre-filled macro porous support scaffolds.

The thickness of the membrane may be in the range of $0 < t < 400$ μm, with a preferred range of 100 nm to 200 μm.

The macro porous support scaffold may be a porous substrate pre-filled with removable filler. The pore size ranges 1 micron or bigger. After the formation of the ionic conductive membrane, the pre-filling material may be removed, such as by dissolving or through heat treatment. Examples of potential porous substrates may include, but not limited to, nickel foam, copper foam, carbon foam, silicon foam, silicon carbide, silicon nitride, aluminum nitride, alumina, zirconia, etc.

In yet another embodiment, the macro porous support scaffold may be a solid green body of a supporting material with a flat surface which can be further treated after the formation of the ionic conductive membrane to provide the macro porous scaffold. Examples of potential green bodies may include, but not limited to, silicon carbide, silicon nitride, zirconium dioxide, aluminum oxide, etc.

In yet another embodiment, a polymer matrix may be used to fill the macro porous support scaffold. After curing and preparation, the ionic conductive membrane may be built on top. The macro porous scaffold can then be removed leaving the negative imprint of the polymer matrix which acts as the new macro porous support scaffold.

In yet another embodiment, the macro porous support scaffold may have the shape of, but not limited to, planar, tubular, cylinder, etc.

This present description further relates to structural designs of the ionic conductive membranes on a pre-filled macro porous scaffold.

A structural design for ionic conductive membranes has the following characteristics.

The ionic conductive membrane may be chemically stable with the removable filler.

The ionic conductive membrane may be chemically stable with the macro porous support scaffold.

The ionic conductive membrane may meet mechanical strength requirements to withstand the forces applied during removal of the removable filler.

The ionic conductive membrane may be chemically inert to any liquid media it is exposed to during the removal of the removable filler, thus to avoid chemical corrosion and erosion.

The ionic conductive membrane may need to withstand any applied temperature that it is exposed to for the purposes of removing the removable filler.

The ionic conductive membrane may be generally planar with some exceptions where the pre-filled supporting scaffold might happen to be non-planar.

A material used for the ceramic membrane may have one or more of the following characteristics.

An ionic conductive membrane may be electrically conductive, semi electrically conductive or non-electrically conductive.

An ionic conductive membrane may be chemically stable in an aqueous or non-aqueous solution.

An ionic conductive membrane may be stable in an acidic or basic solution.

An ionic conductive membrane may require further thermal treatment for densification purposes.

An ionic conductive membrane may have a low porosity prior to sintering, may be >25% or more.

An ionic conductive membrane may have a high or low tensile strength within reason.

An ionic conductive membrane is preferably to be a continuous layer that is flat and uniform as to allow electrical current to distribute evenly.

This present description further outlines the requirements of the macro porous scaffold.

The macro porous support scaffold is preferably to be chemically compatible with the ionic conductive membrane.

The macro porous support scaffold is preferably to be either compatible with the sintering temperature of the ionic conductive membrane or capable of withstanding a reasonable temperature to partially densify the ionic conductive membrane.

The macro porous support scaffold is preferably to be stable with any solutions or materials used to build the ionic conductive membrane.

The macro porous support scaffold may need to withstand any conditions it is exposed to during the formation of the ionic conductive membrane.

The macro porous support scaffold may need to withstand the sintering temperatures that is required for the ionic conductive membrane unless stated.

The macro porous support scaffold may be chemically compatible with the removable filler substance.

The macro porous support scaffold is preferably to be chemically compatible with any solutions used to remove the removable filler.

The macro porous support scaffold may need to meet mechanical strength requirements to withstand the forces applied during removal of the removable filler.

The macro porous support scaffold may be generally planar with some exceptions where the macro porous support scaffold might happen to be non-planar.

The macro porous support scaffold is preferably to be able to withstand any applied temperature that is required for the removal of the removable filler.

The macro porous support scaffold may be electrically conductive, semi electrically conductive or non-electrically conductive.

The macro porous support scaffold may be chemically stable in an aqueous or non-aqueous solution.

The macro porous support scaffold may be stable in an acidic or basic solution.

The macro porous support scaffold may not be selective to any metals, liquids, gases, or ions.

This present description further outlines the requirements of the removable filler.

The removable filler may be chemically stable with the ionic conductive membrane.

The removable filler is preferably to be stable with any solutions or materials used to build the ionic conductive membrane.

The removable filler is preferably to be able to withstand any temperature it is exposed to during the formation of the ionic conductive membrane.

The removable filler may need to withstand any conditions it is exposed to during the formation of the ionic conductive membrane.

The removable filler is preferably to be either be compatible with the sintering temperature of the ionic conductive membrane or capable of withstanding a reasonable temperature to partially densify the ionic conductive membrane.

The removable filler may be chemically stable with the macro porous support scaffold.

The removable filler may be chemically stable with any solution it is subjected to for the exception of any solution used for its removal.

The removable filler can fit into or fill in the voids of the macro porous support scaffold.

The removable filler can be removed by means it is subjected to.

The drawings of the present disclosure further describe examples of solid state ionic conductive membranes on macro porous support scaffolds and methods of making the same.

Figure 1A:
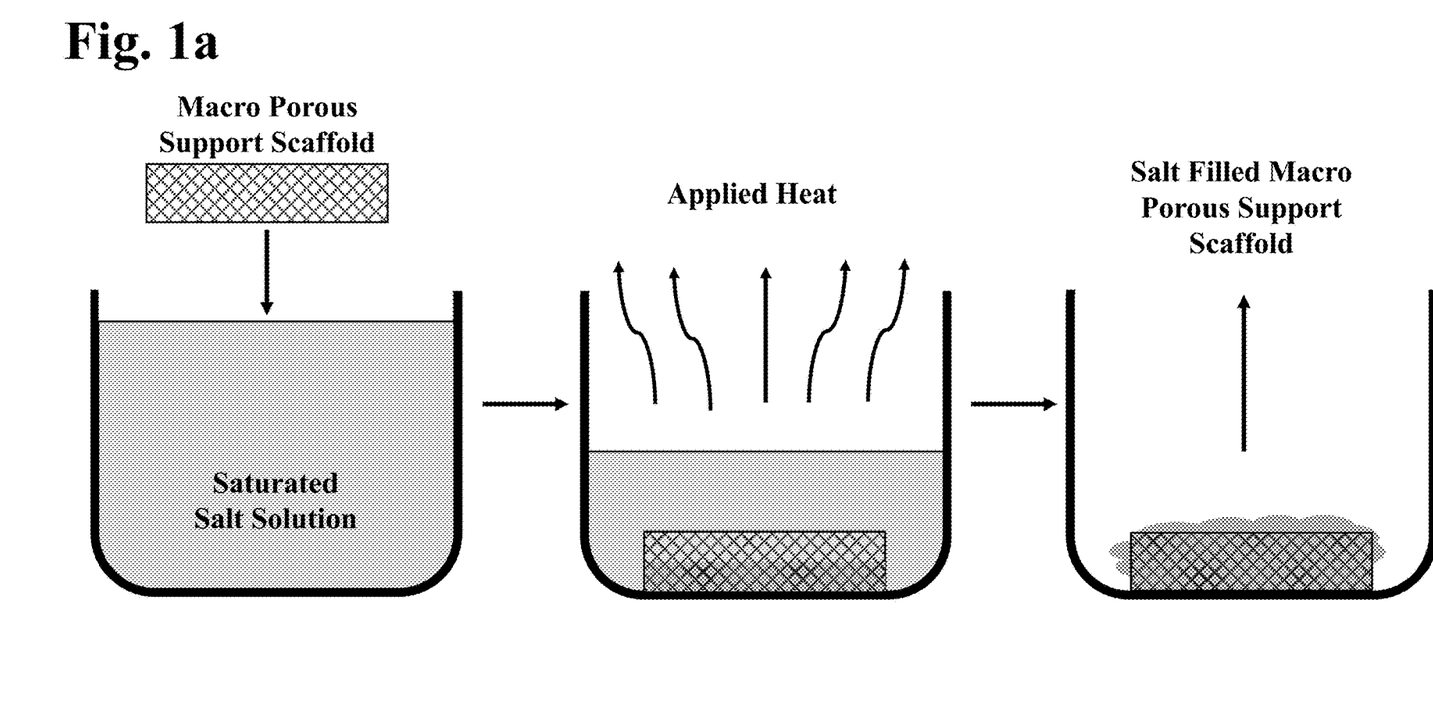
FIG. 1a is a schematic illustrating the pre-filling process of a macro porous scaffold with salt from a saturated salt solution.

FIG. 1a: A schematic illustrating the pre-filling process of a macro porous scaffold with salt from a saturated salt solution.

Figure 1B:
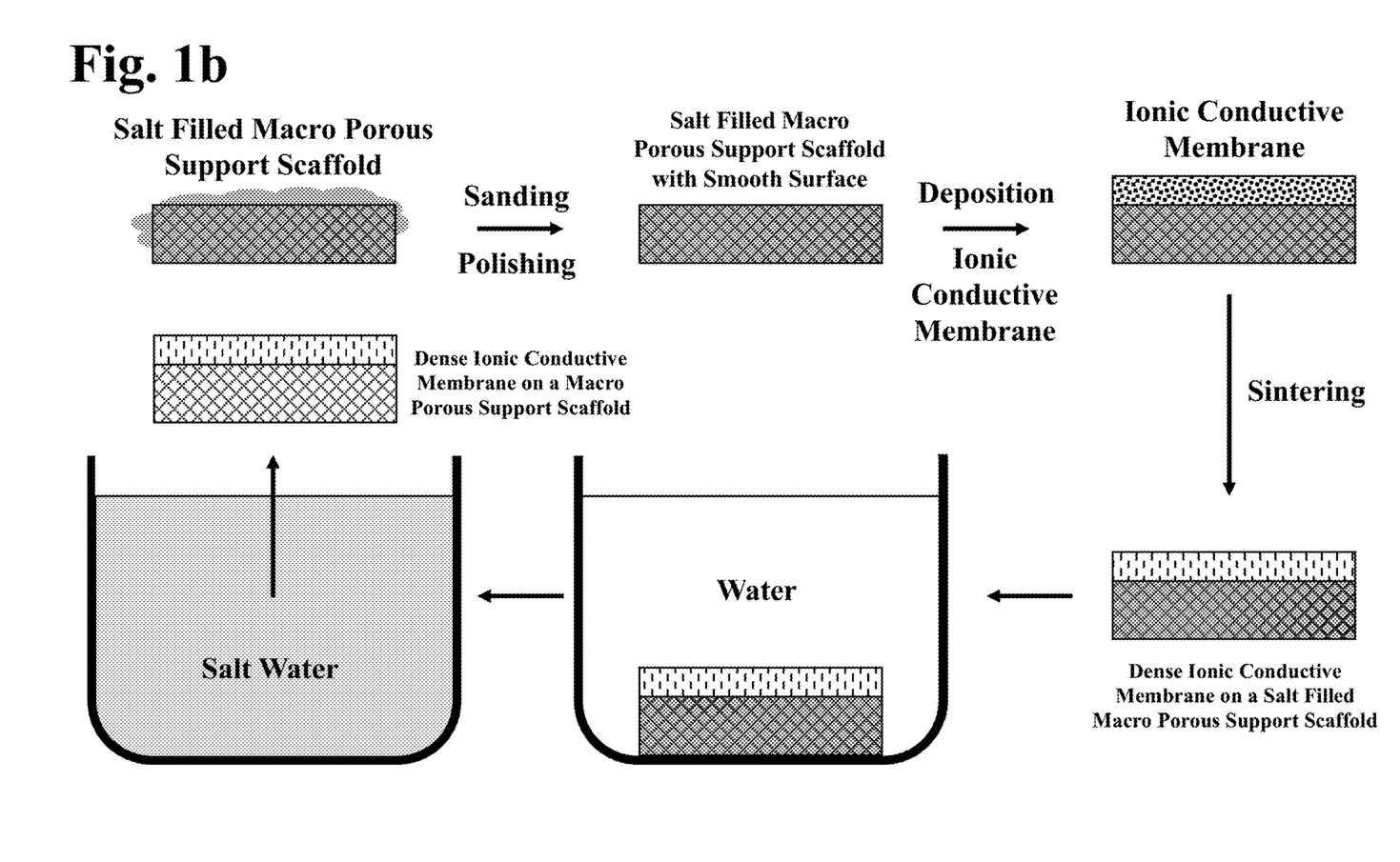
FIG. 1b is a schematic illustrating the dissolving process of the pre-filled salt filler from the macro porous support scaffold.

FIG. 1b: A schematic illustrating the dissolving process of the pre-filled salt filler from the macro porous support scaffold.

Figure 2A:
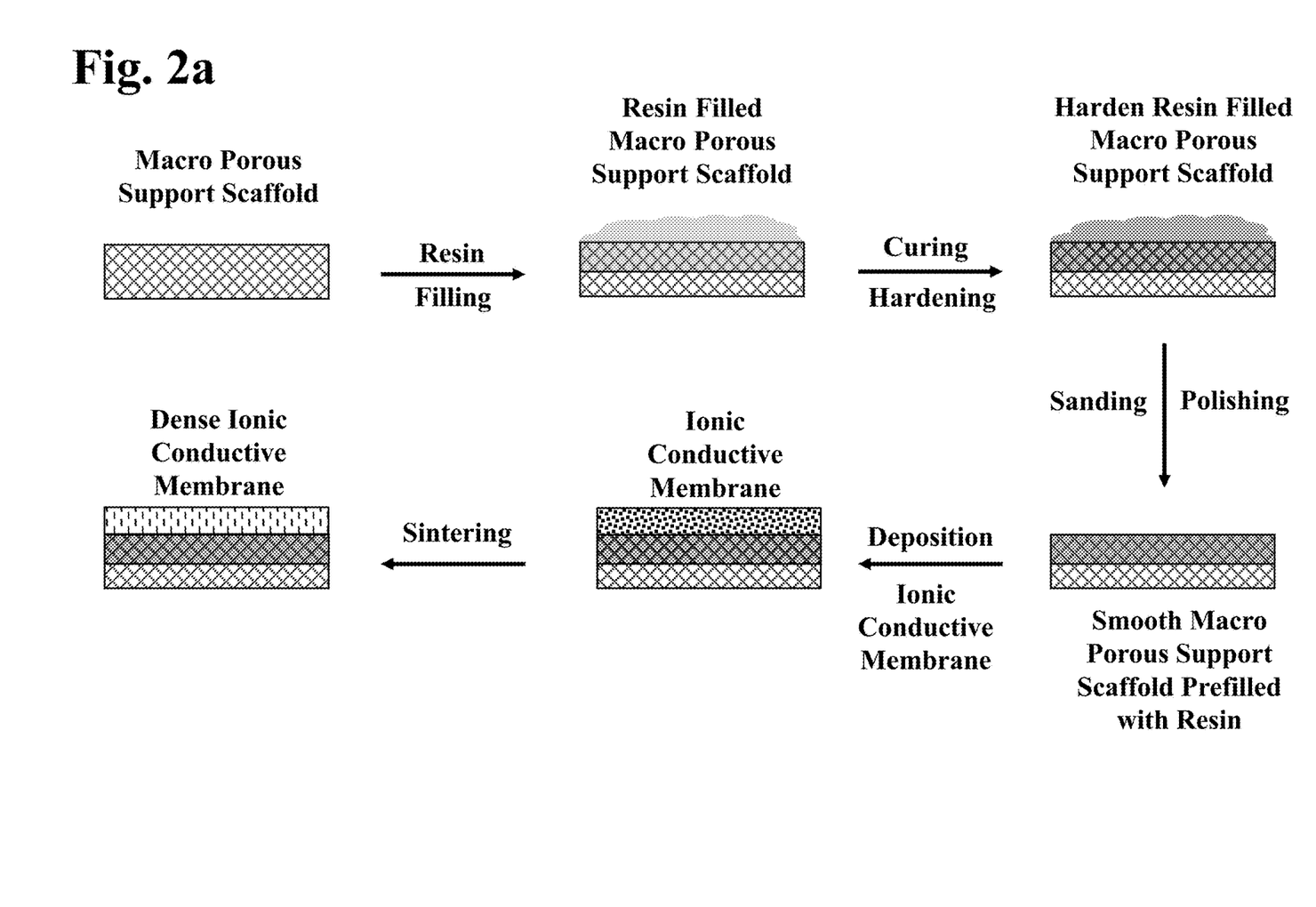
FIG. 2a is a schematic illustrating the pre-filling process of a macro porous support scaffold with a resin followed by deposition and sintering of a ionic conductive membrane.

FIG. 2a: A schematic illustrating the pre-filling process of a macro porous support scaffold with a resin followed by deposition and sintering of a ionic conductive membrane.

Figure 2B:
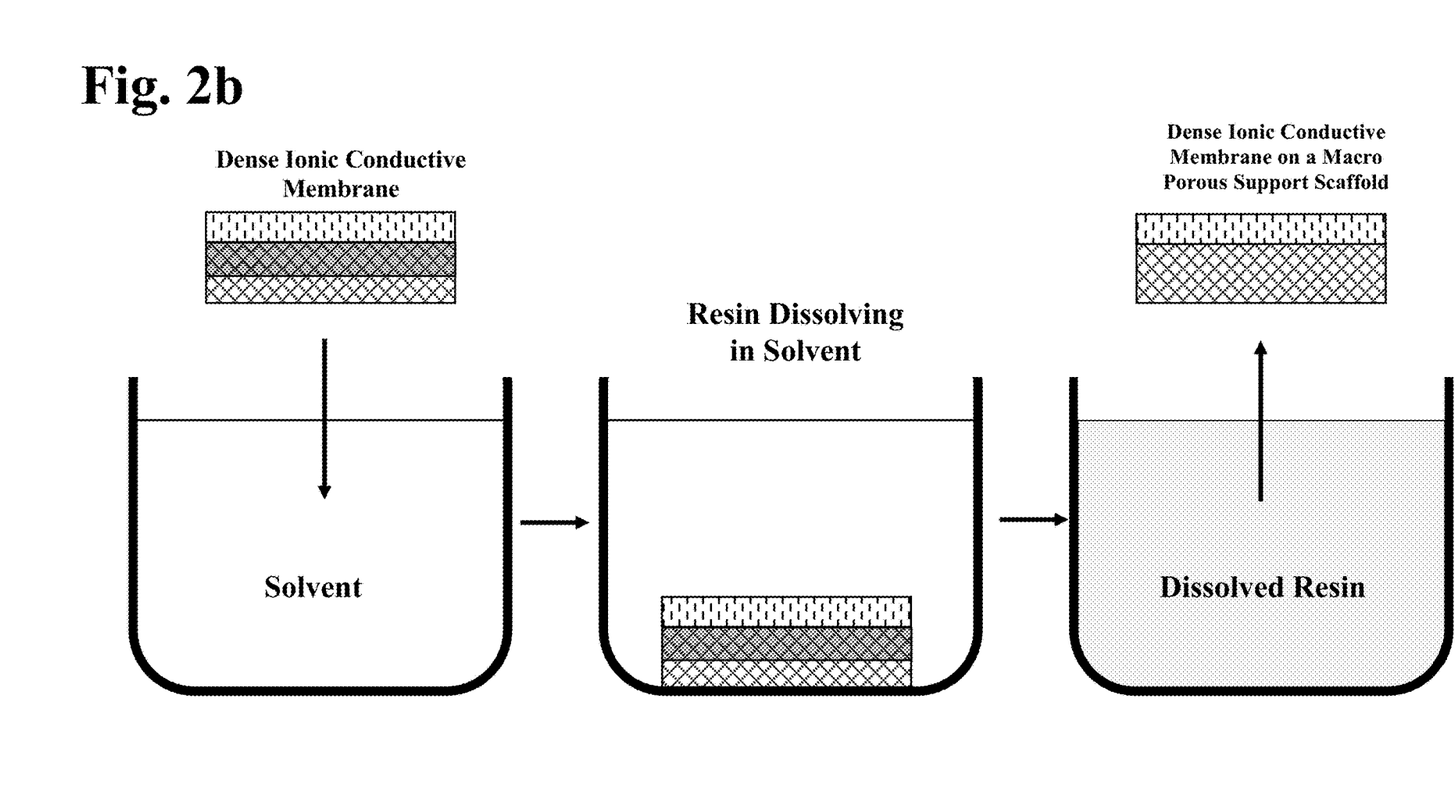
FIG. 2b is a schematic illustrating the dissolving process of the pre-filled resin filler from the macro porous support scaffold.

FIG. 2b: A schematic illustrating the dissolving process of the pre-filled resin filler from the macro porous support scaffold.

Figure 3A:
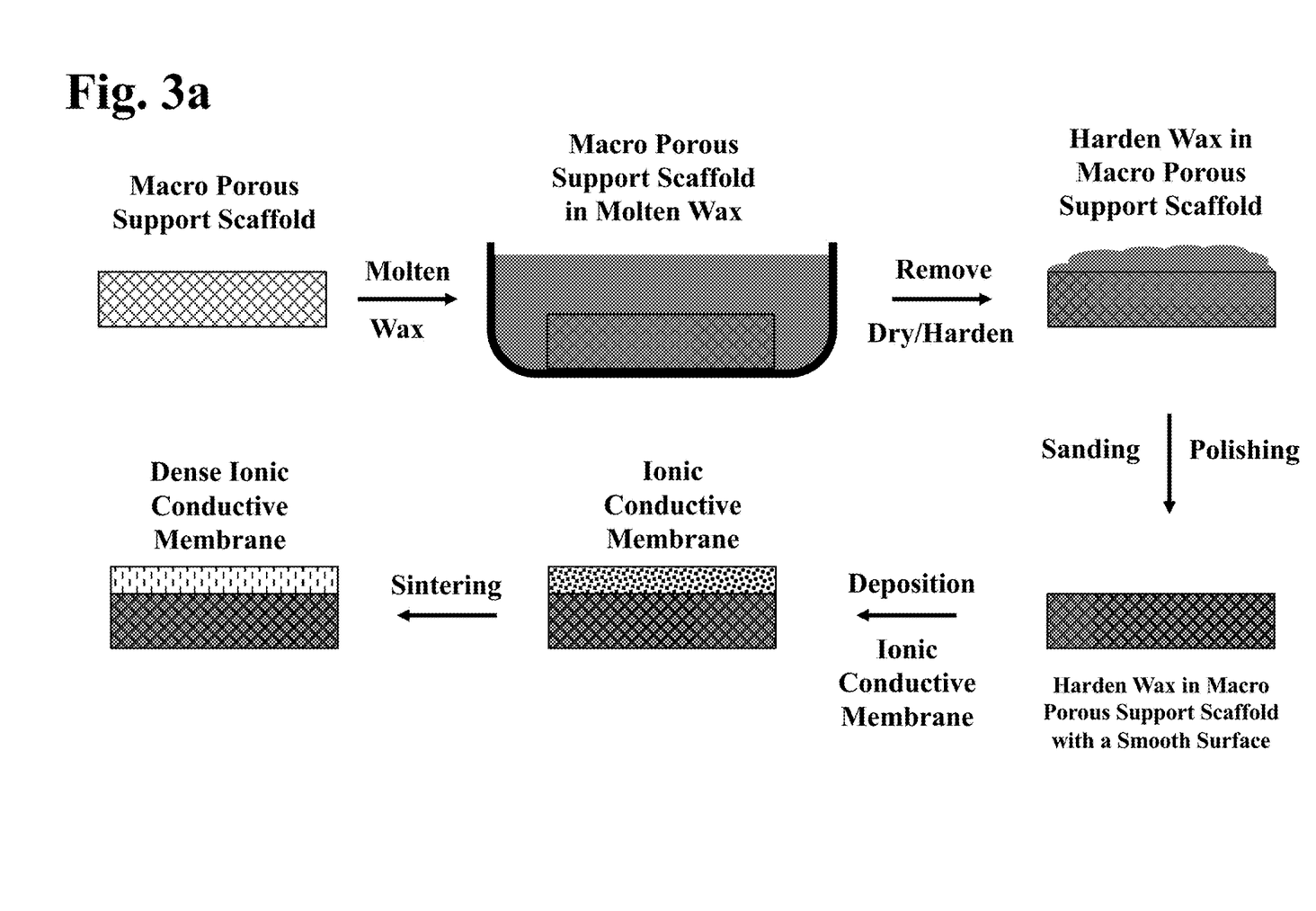
FIG. 3a is a schematic illustrating the pre-filling process of a macro porous support scaffold with wax followed by the deposition and sintering of a ionic conductive membrane.

FIG. 3a: A schematic illustrating the pre-filling process of a macro porous support scaffold with wax followed by the deposition and sintering of a ionic conductive membrane.

Figure 3B:
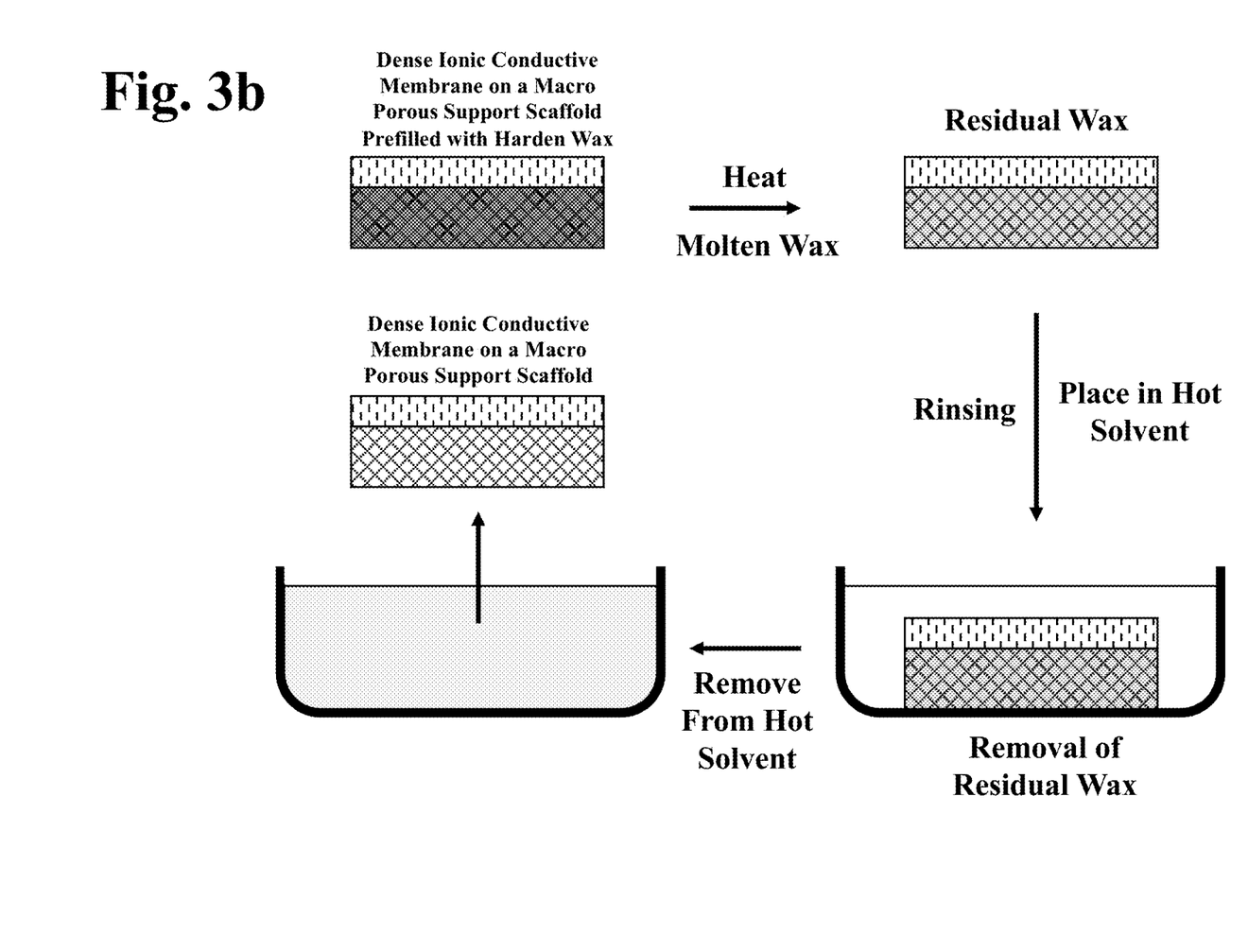
FIG. 3b is a schematic illustrating the removal of the pre-filled wax filler the macro porous support scaffold.

FIG. 3b: A schematic illustrating the removal of the pre-filled wax filler the macro porous support scaffold.

Figure 4A:
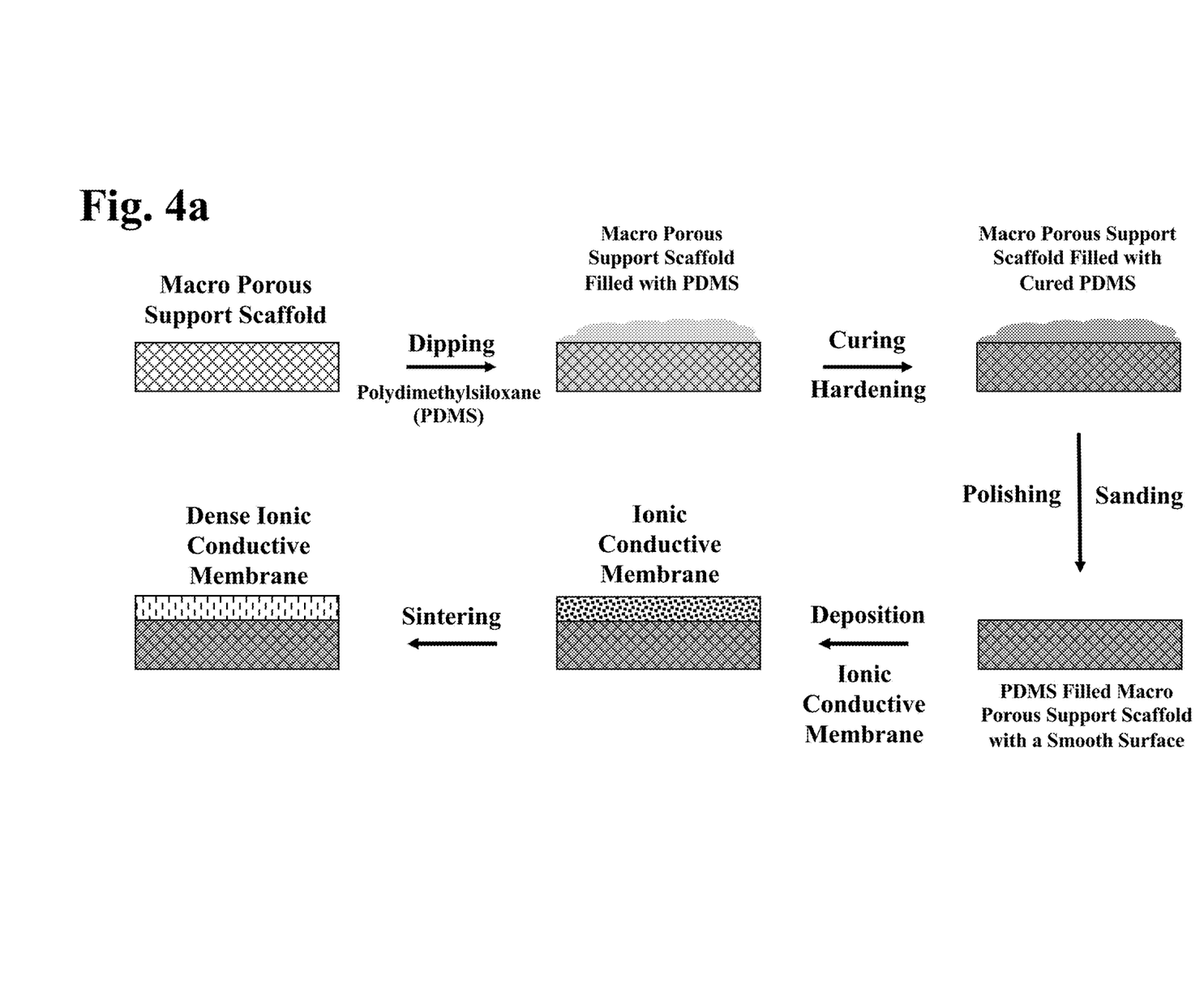
FIG. 4a is a schematic illustrating the pre-filling process of a macro porous support scaffold with PDMS followed by the deposition and sintering of a ionic conductive membrane.

FIG. 4a: A schematic illustrating the pre-filling process of a macro porous support scaffold with PDMS followed by the deposition and sintering of a ionic conductive membrane.

Figure 4B:
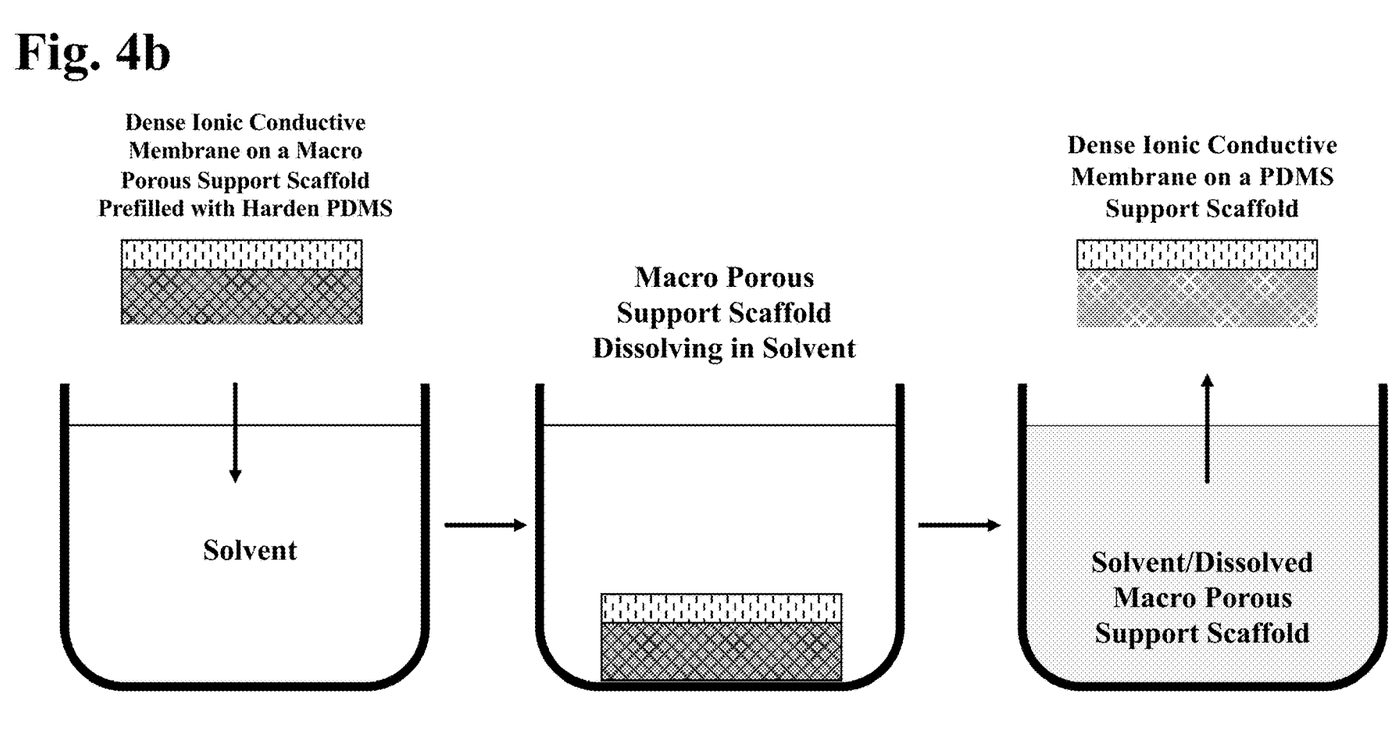
FIG. 4b is a schematic illustrating the dissolving process of the macro porous support scaffold leaving behind the negative imprint of the PDMS support scaffold.

FIG. 4b: A schematic illustrating the dissolving process of the macro porous support scaffold leaving behind the negative imprint of the PDMS support scaffold.

Figure 4C:
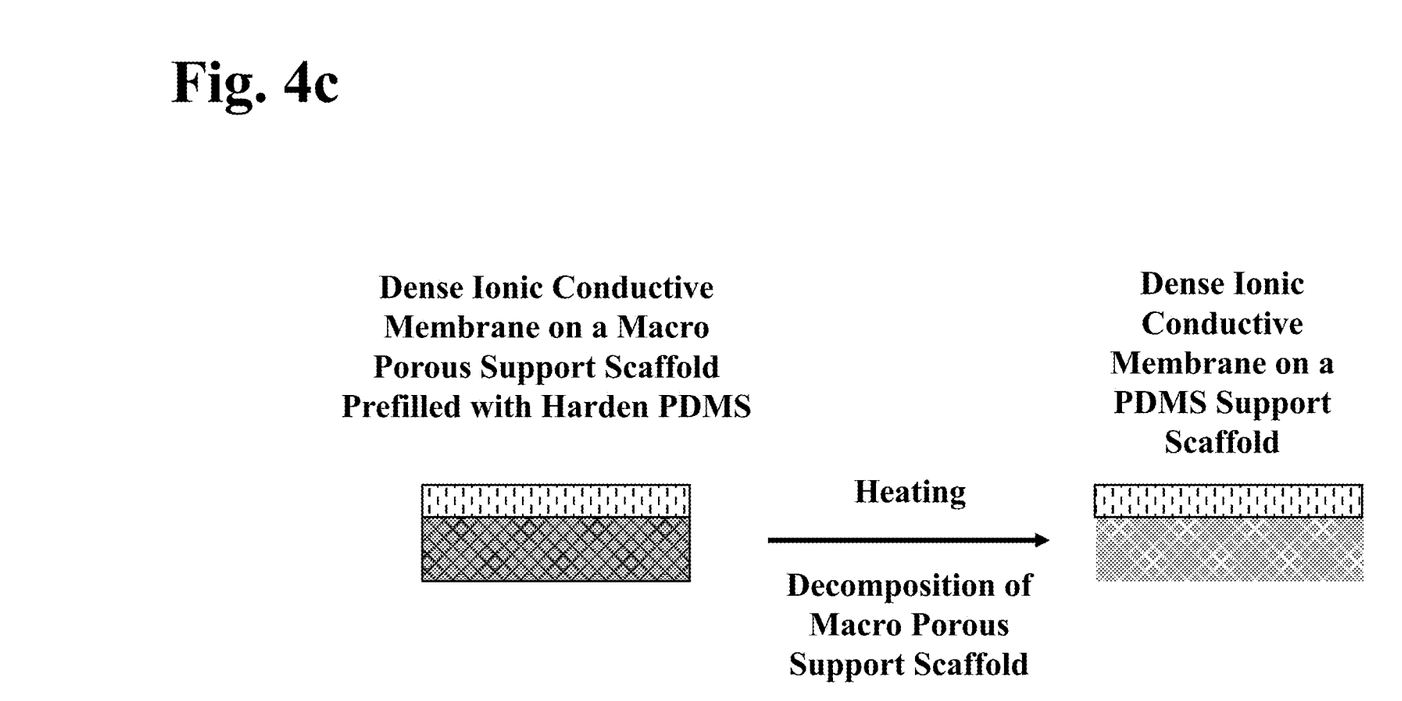
FIG. 4c is a schematic illustrating the decomposition process of the macro porous support scaffold leaving behind the negative imprint of the PDMS support scaffold.

FIG. 4c: A schematic illustrating the decomposition process of the macro porous support scaffold leaving behind the negative imprint of the PDMS support scaffold.

Figure 5:
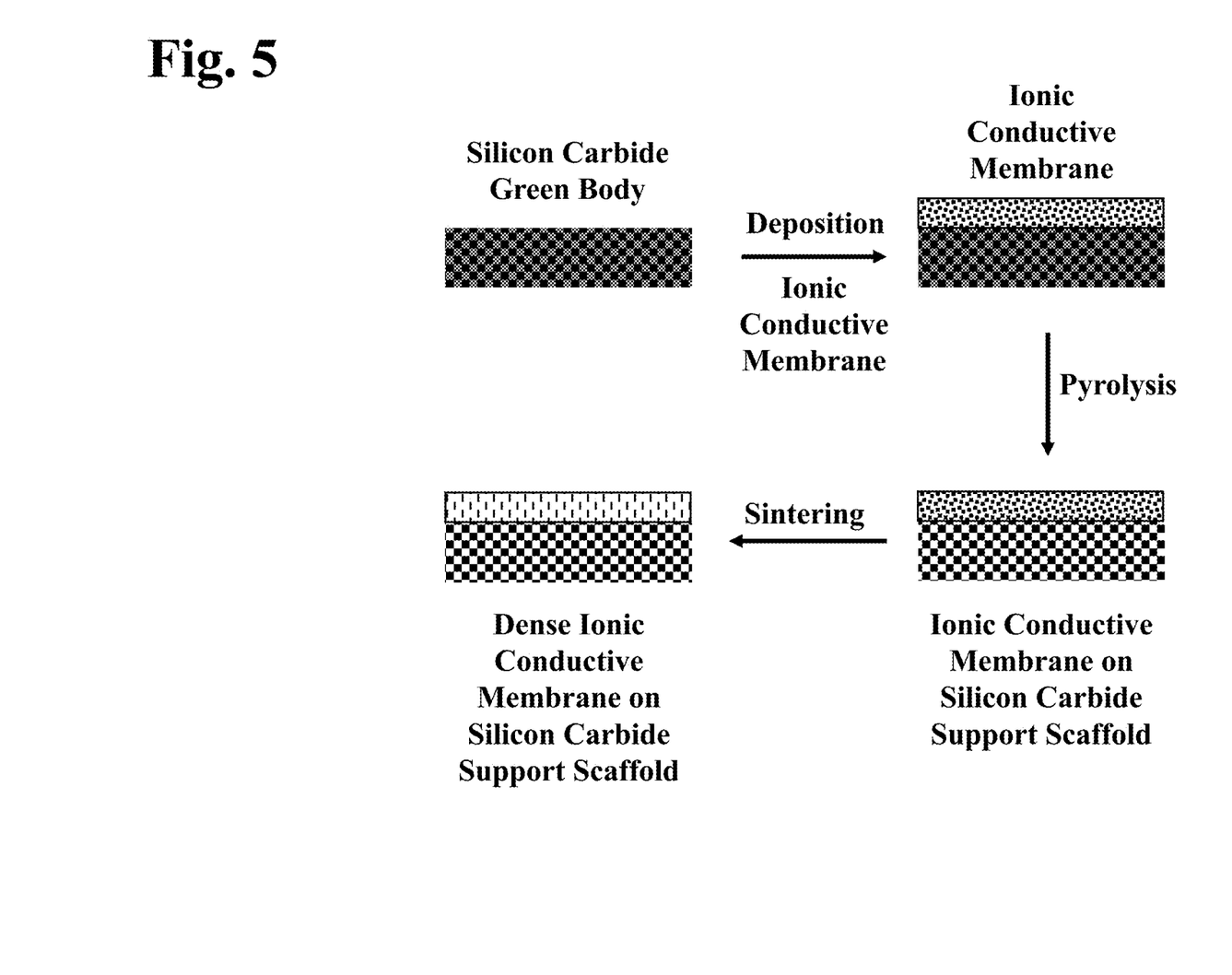
FIG. 5 is a schematic illustrating the formation of a green body support scaffold followed by a pyrolysis process to form a silicon carbide support scaffold with a ionic conductive membrane on top.

FIG. 5: A schematic illustrating the formation of a green body support scaffold followed by a pyrolysis process to form a silicon carbide support scaffold with a ionic conductive membrane on top.

With reference to the drawings, methods for forming an ionic conductive membrane on a pre-filled macro porous scaffold may include one of the following.

In an aspect, a filler is used to temporarily fill the voids in the macro porous support scaffold. One side of the pre-filled macro porous support scaffold may be sanded or grounded down as to provide a smooth surface. The ionic conductive membrane can be built on top of the smooth surface. After the ionic conductive membrane is constructed the filler is then removed.

Macro porous support scaffolds may include, but not limited to nickel foam, copper foam, carbon foam, silicon foam, silicon carbide, silicon nitride, aluminum nitride, alumina, zirconia, etc.

An example of a filling method includes, but is not limited to, placing the porous support structure in a saturated salt solution followed by the removal of the water through evaporation leaving the voids filled with a solid salt. After the ionic conductive membrane is built on top, the ionic conductive membrane can be thermally treated or sintered for densification purposes. After sintering the ionic conductive membrane can be placed in fresh water as to remove or dissolve the salt filler away. On the other hand, the filler can be removed before sintering process.

Removable salt fillers may include, but not limited to halide, sulfate, nitrate, hydroxide, oxide, sulfide, carbonate, nitrite, acetate, citrate, cyanide, phosphate, etc.

Another example of a filling method includes, but not limited to filling the voids of the macro porous support structure with a resin followed by curing. After the ionic conductive membrane is built on top, the resin can be removed by placing the ionic conductive membrane in an aqueous or non-aqueous solvent.

Removable resins fillers may include, but limited to polyesters, epoxies, polyurethanes and silicones.

Removable resin fillers may be deposited onto the macro porous support scaffold by means of, but not limited to spraying, spin coating, drop casting, dipping, etc.

Another example of a filling method includes, but not limited to, filling the voids of the macro porous support structure with hot wax, which can be allowed to cool and harden. After the ionic conductive membrane is built on top, the harden wax can be removed by applying heat to liquify the wax. The macro porous support scaffold and be pulled quickly from the molten wax and further washed in a hot nonpolar or organic solvent to remove residual wax.

Removable wax fillers may include, but not limited to, animal waxes, plant waxes, mineral waxes, and petroleum waxes.

In an aspect, a liquid polymer is used to fill the voids of the macro porous support scaffold followed by curing or drying. One side of the porous support structure may be sanded or grounded down after filling to provide a smooth surface. The ionic conductive membrane is built on top of the smooth surface. After the ionic conductive membrane is constructed the macro porous support structure is removed, thus leaving the negative imprint of the polymer structure as the new macro porous support scaffold.

Polymers may include, but not limited to, polydimethylsiloxane (PDMS), polyvinylidene difluoride (PVDF), or polyethylene terephthalate (PETE). Although PDMS is preferred owing to its higher temperature resistance and chemical capability.

An example of polymer filling method includes, but not limited to; filling the voids of a nickel foam support scaffold with polydimethylsiloxane followed by curing. After the ionic conductive membrane is built on top, the nickel foam is etched away by placing the ionic conductive membrane in a weak acid solution such as hydrochloric acid or nitric acid.

Another example of a polymer filling method includes, but not limited to; filling the voids of a copper foam are filled with polydimethylsiloxane followed by curing. After the ionic conductive membrane is built on top, the copper foam is dissolved away by placing the ionic conductive membrane in a mixture of hydrogen peroxide and hydrochloric acid.

Another example of a polymer filling method includes, but not limited to; filling the voids of a carbon foam with polydimethylsiloxane followed by curing. After the ionic conductive electrolyte is built on top, the carbon foam is removed by heating the ionic conductive membrane to a temperature no lower than 100 degrees centigrade and no higher than 400 degrees centigrade in the presence of oxygen. The heating serves the purposes of densification of the ionic conductive membrane and decomposition of the carbon foam.

In an aspect, an ionic conductive membrane can be built on a macro porous support scaffold forming green body followed by co-pyrolysis processing.

An example of a macro porous support scaffold forming green body method includes, but not limited to; using a highly crosslinked hybrid organic-inorganic polymer resin matrix composed of polycarosilane, diisocyanates and an epoxy resin to prepare a silicon carbide foam. Typically, the resulting hybrid matrix is heated, and a subsequent pyrolysis yields an open cell silicon carbide foam. Before the pyrolysis process, the ionic conductive membrane can be built on the surface of the hybrid matrix. After the ionic conductive membrane is built, then the pyrolysis can yield the open cell silicon carbide foam. In essence, the silicon carbide foam is the macro porous support scaffold, however, instead of filling the voids of the silicon carbide, the green body structure of the foam prior to pyrolysis acts as both a macro porous support scaffold and a removable filler.

In an aspect, the ionic conductive membrane may be partially sintered at a lower temperature for a shorter time or fully sintered at a lower temperature for a longer time as to allow the filling substance to stay intact until a ionic conductive membrane is stable.

In an aspect, the ionic conductive membrane may be built with traditional slurry sedimentation, spraying, dipping, filtration, pyrolysis, electroplating, plasma spray, thermal spray, injection, chemical vapor deposition, physical vapor deposition and sputtering. These processes can be followed by heat treatment to densify the ionic conductive layer.

The above described methods can be ascribed to the formation of ionic conductive membrane on a macro porous support scaffold for the use gas filtration and collection. Gases may include, but not limited to, hydrogen, nitrogen, oxygen, etc.

The above described methods can be ascribed to the formation of ionic conductive membrane on a macro porous support scaffold for the use recycling and collecting metals from a metal rich system or solution. Metals may include, but not limited to, lithium, sodium, magnesium, potassium, etc.

The above described methods can be ascribed to the formation of ionic conductive membrane on a macro porous support scaffold for the use of a membrane separator in a redox flow battery. Redox flow batteries may include, but not limited to, lithium flow batteries, vanadium flow batteries, etc.

The above described methods can be ascribed to the formation of ionic conductive membrane on a macro porous support scaffold for applications that require a ionic conductive membrane where the ionic conductive membrane requires additional support for enhancing the mechanical strength from a macro porous support scaffold.

Although various embodiments of the disclosed method for manufacturing a solid state ionic conductive membrane have been shown and described, modifications may occur to those skilled in the art upon reading the specification. The present application includes such modifications and is limited only by the scope of the claims.

What is claimed is:

1. A method for manufacturing a solid state ionic conductive membrane, the method comprising:
providing a support scaffold having a first side and a second side opposite of the first side;
forming a solid state ionic conductive membrane on the support scaffold; and
treating the support scaffold to be macro porous.

2. The method of claim 1, wherein support scaffold comprises a macro porous substrate pre-filled with a filler material, and wherein the step of treating the support scaffold to be macro porous comprises removing the filler material.

3. The method of claim 2, wherein the macro porous substrate comprises at least one of nickel foam, copper foam, carbon foam, silicon foam, silicon carbide, silicon nitride, aluminum nitride, alumina, and zirconia.

4. The method of claim 2, wherein the filler material comprises a salt.

5. The method of claim 2, wherein the filler material comprises a resin.

6. The method of claim 2, wherein the filler material comprises a wax.

7. The method of claim 1, wherein support scaffold comprises a macro porous substrate pre-filled with a filler material, and wherein the step of treating the support scaffold to be macro porous comprises hardening the filler material and removing the macro porous substrate.

8. The method of claim 7, wherein the filler material comprises a polymer.

9. The method of claim 8, wherein the step of hardening the filler material comprises at least one of curing the filler material and drying the filler material.

10. The method of claim 8, wherein the step of removing the macro porous substrate comprises at least one of dissolving the macro porous substrate and heating the macro porous substrate.

11. The method of claim 1, wherein support scaffold comprises a solid green body, and wherein the step of treating the support scaffold to be macro porous comprises transforming the solid green body to a macro porous support scaffold.

12. The method of claim 11, wherein macro porous support scaffold comprises at least one of silicon carbide, silicon nitride, zirconium dioxide, and aluminum oxide.

13. The method of claim 1, further comprising densifying the solid state ionic conductive membrane.

14. A method for manufacturing a solid state ionic conductive membrane, the method comprising:
providing a non-porous support scaffold having a first side and a second side opposite of the first side, wherein the first side is defined by a first continuous surface of the non-porous support scaffold;
forming a layer of solid state ionic conductive membrane onto the first continuous surface of the non-porous support scaffold;
treating the non-porous support scaffold to be macro porous; and
densifying the solid state ionic conductive membrane before or during the step of treating the non-porous support scaffold to be macro porous.

15. The method of claim 14, wherein the step of densifying the solid state ionic conductive membrane includes sintering the solid state ionic conductive membrane.

16. The method of claim 14, wherein the macro porous support scaffold has pores of a size greater than 50 nanometers.

17. The method of claim 14, wherein the layer of solid state ionic conductive membrane has a first side and a second side opposite of the first side and a thickness of the solid state ionic conductive membrane defined by a distance between the first side and the second side is in a range of 100 nm to 200 μm.

* * * * *